(12) United States Patent
Gillen (10) Patent No.: US 6,971,633 B2
(45) Date of Patent: Dec. 6, 2005

(54) ROTATABLE SEAL FOR BALL VALVE

(75) Inventor: Mark E. Gillen, Zionsville, IN (US)

(73) Assignee: Banjo Corporation, Crawfordsville, IN (US)

( * ) Notice: Subject to any disclaimer, the term of this patent is extended or adjusted under 35 U.S.C. 154(b) by 199 days.

(21) Appl. No.: 10/272,192

(22) Filed: Oct. 15, 2002

(65) Prior Publication Data

US 2004/0069968 A1    Apr. 15, 2004

(51) Int. Cl.[7] ................................................ F16X 5/00
(52) U.S. Cl. .......................... 251/315.07; 251/315.16; 251/315.14; 251/315.1
(58) Field of Search .................... 291/315.1–315.15, 291/314, 316, 317, 317.01, 315.01, 315.07

(56) References Cited

U.S. PATENT DOCUMENTS

| | | | |
|---|---|---|---|
| 1,330,429 A | | 2/1920 | Campbell |
| 3,095,898 A | | 7/1963 | Freeman et al. |
| 3,533,597 A | | 10/1970 | Bolling |
| 3,784,155 A | | 1/1974 | Tomlin |
| 3,827,671 A | | 8/1974 | Bolden et al. |
| 4,193,580 A | | 3/1980 | Norris et al. |
| 4,411,407 A | | 10/1983 | Ninomiya et al. |
| 4,637,421 A | | 1/1987 | Stunkard |
| 4,683,906 A | * | 8/1987 | Butler et al. ................. 137/375 |
| 5,152,502 A | | 10/1992 | Randall et al. |
| 5,181,539 A | | 1/1993 | Yokoyama |
| 5,313,976 A | | 5/1994 | Beasley |
| 5,445,187 A | | 8/1995 | Farquhar |
| 5,482,253 A | * | 1/1996 | Klyde ................... 251/315.07 |
| 5,911,405 A | | 6/1999 | Korczynski, Jr. et al. |
| 6,173,940 B1 | | 1/2001 | Kardohely et al. |
| 6,267,353 B1 | | 7/2001 | Friedline et al. |
| 6,485,000 B1 | * | 11/2002 | Klyde et al. ........... 251/315.07 |
| 2001/0045231 A1 | | 11/2001 | Monod |

FOREIGN PATENT DOCUMENTS

| | | |
|---|---|---|
| AU | 592 473 B | 1/1990 |
| DE | 195 20 900 A | 12/1996 |
| EP | 0 217 993 A | 4/1987 |

OTHER PUBLICATIONS

European Search Report, Application No. EP 03 02 3269, Banjo Corporation, dated Dec. 16, 2003.

* cited by examiner

Primary Examiner—J. Casimer Jacyna
(74) Attorney, Agent, or Firm—Baker & Daniels LLP (57) ABSTRACT

A ball valve assembly having two end bodies selectively detachable from each other with each end body defining a fluid conveying bore is provided. A rotatable ball valve element is disposed within the end bodies and defines a central passage having an axis, with the rotatable ball valve element having an open position in which the central passage is aligned with the fluid conveying bores and a closed position in which the passage is not aligned with the fluid conveying bores. The ball valve assembly also includes a pair of seals, with a seal disposed in each end body and in selective abutting engagement with the rotatable ball valve element. The structure of the rotatable ball valve element is controlled such that the ball valve assembly is assembled with the ball in an open position, thereby substantially eliminating the significant force normally required for assembly of the ball valve assembly.

24 Claims, 5 Drawing Sheets

ROTATABLE SEAL FOR BALL VALVE

BACKGROUND OF THE INVENTION

1. Field of the Invention

The present invention relates to fluid handling products, and, in particular, to ball valves utilized to regulate the flow of fluid materials.

2. Description of the Related Art

Valves are well-known components of various fluid handling systems, including systems used in agricultural, pharmaceutical, and other such industries, and other related fluid handling applications. Ball valves have proven to be particularly useful in these fluid handling systems, specifically for regulation of the flow of the fluid materials through the system and to the ultimate end use. Such ball valve assemblies are easily inserted into the fluid handling systems; however, the assembly of such ball valve assemblies is rather problematic.

With all valves, the prevention of fluid leaks is paramount. To prevent fluid from escaping from a valve when the ball is rotated to its closed position, the seals surrounding the ball should contact the ball and conform to the surface of the ball such that there is no path available through which fluid may escape. The pressure produced by the seal-ball contact is then transferred from the valve housing to the seals. However, such pressure is difficult to overcome during the assembly process since the force required to create effective sealing contact between the ball and the seal can be large enough to make mechanical assembly difficult. Such force can not be readily eliminated since the housing must be able to accommodate a ball having a diameter greater than the fluid port, and the valve housing generally includes two or more pieces that fasten together mechanically by bolts or by screw threads connecting the housing components together, or by welding, riveting or other such means of mechanical connection. Creating the mechanical connection requires significant force which may stress both the valves and the assembly equipment, negatively impacting their performance.

SUMMARY OF THE INVENTION

A ball valve assembly having two end bodies selectively detachable from each other with each end body defining a fluid conveying bore is provided with a rotatable ball valve element cut off at an angle which facilitates assembly. The rotatable ball valve element is disposed within the end bodies and defines a central passage having an axis, with the rotatable ball valve element having an open position in which the central passage is aligned with the fluid conveying bores and a closed position in which the passage is not aligned with the fluid conveying bores. The ball valve assembly also includes a pair of seals, with a seal disposed in each end body and in selective abutting engagement with the rotatable ball valve element. The structure of the rotatable ball valve element is controlled such that the ball valve assembly is assembled with the ball in an open position, thereby substantially eliminating the significant force normally required for assembly of the ball valve assembly.

The present invention provides a valve assembly for controlling a flow of fluid including a first end body including a fluid conveying bore, a second end body selectively detachable from the first end body and including at least one fluid conveying bore therethrough, a rotatable ball valve element having a radius, and at least a pair of seal members with a seal member disposed in the first end body and a second seal member disposed in the second end body. The rotatable ball valve element has a first position wherein the first end body fluid conveying bore and the second end body fluid conveying bore are not in fluid communication, and a second position wherein the first end body fluid conveying bore and the second end body fluid conveying bore are in fluid communication. The seals are structured and arranged to substantially prevent fluid flow when the rotatable ball valve element is in the first position, with each seal defining a seal contact area wherein the radius of the rotatable ball valve element contacts the seal when the rotatable ball valve element is in its first position. The rotatable ball valve element defines a passage having an axis, an axial distance being defined between a line perpendicular to the axis and the seal contact area and a radial distance being defined between the axis and the seal contact area, the radial distance being perpendicular to the axial distance, and wherein a ratio of the radial distance to the axial distance has a numerical value of less than 1.

The present invention further provides a rotatable element for a ball valve assembly having at least one body portion for the rotatable element and associated seals. The rotatable element includes a body having a generally spherical outer surface and a radius at which the body contacts the seals to define a seal contact area, the body defines a passage having a central axis, and the rotatable element defines a centerline co-planar and perpendicular to the passage central axis. An axial distance is defined between the centerline and the seal contact area, and a radial distance is defined between the passage central axis and the seal contact area; wherein a ratio of the radial distance to the axial distance has a numerical value of less than 1.

The present invention further provides a method of assembling a ball valve for use in fluid handling applications, the method includes providing a valve body having a first portion and a second portion, each portion having a port therethrough with the ports being axially aligned with the valve body when assembled, providing a rotatable element having a passage therethrough, rotating the rotatable element into a position wherein the passage aligns with the ports of the valve body, inserting the rotatable element between the first portion and the second portion of the valve body, securing the first portion and the second portion of the valve body together with a securement mechanism requiring limited force to be applied to the securement mechanism and the portions, compressing the rotatable element therebetween, and rotating the rotatable element into a position wherein the passage is not aligned with the ports.

BRIEF DESCRIPTION OF THE DRAWINGS

The above-mentioned and other features and objects of this invention will become more apparent and the invention itself will be better understood by reference to the following description of an embodiment of the invention taken in conjunction with the accompanying drawings, wherein.

Corresponding reference characters indicate corresponding parts throughout the several views. Although the drawings represent an embodiment of the present invention, the drawings are not necessarily to scale and certain features may be exaggerated in order to better illustrate and explain the present invention. The exemplification set out herein illustrates an embodiment of the invention and such exemplification is not to be construed as limiting the scope of the invention in any manner.

DETAILED DESCRIPTION

For the purposes of promoting an understanding of the principles of the invention, reference will now be made to the embodiments illustrated in the drawings and specific language will be used to describe the same. It will nevertheless be understood that no limitation of the scope of the invention is thereby intended.

Figure 1:
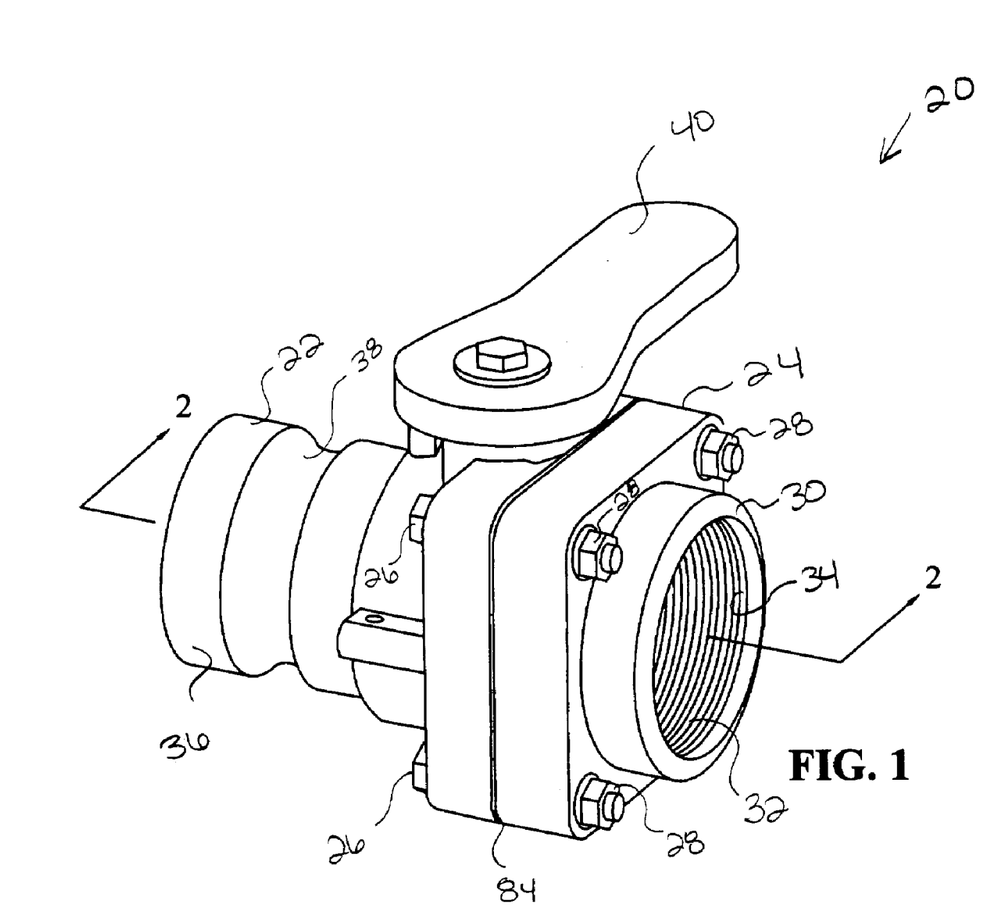
FIG. 1 is a perspective view of an embodiment of a bolted ball valve assembly which is used in accordance with the present invention.

Bolted ball valve assembly 20 is shown in FIG. 1 as including a pair of end bodies 22 and 24 joined by a plurality of bolts 26 through end body 22 and received by nuts 28 in complementary end body 24. End body 24 further includes projection 30 thereon having bore 32 through projection 30 with female threads 34 in bore 32 for receipt of a complementary male threaded element, such as, for example, a coupling or hose fitting. End portion 22 further includes connector section 36 extending from end portion 22 and having large groove 38 formed in connector section 36 for receipt of a connector from an external fluid handling device, such as a hose, or tank fitting, or other coupling. Such a connector or coupling device is shown in phantom in FIG. 2, specifically coupling arms 74, which are shown in phantom in their connected position to valve 20; coupling arms 74 are used to connect valve 20 to another fluid handling device. Pivotably disposed at the top of valve 20 is user actuated handle 40 for imparting rotary force to a rotatable valve element, or ball, as described below.

Figure 2:
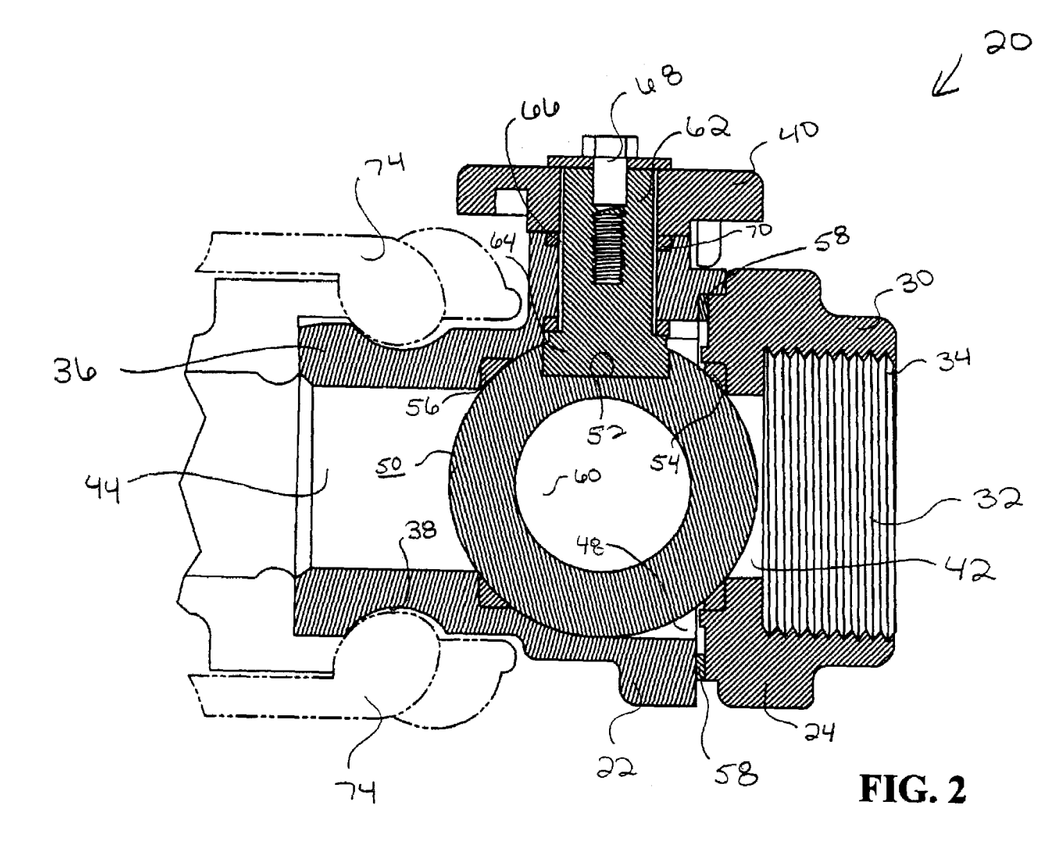
FIG. 2 is a cross-sectional front view taken along line 2—2 of the bolted ball valve assembly of FIG. 1, wherein portions of a mating fluid handling system component are shown in dashed lines.

FIG. 2 shows the interior of valve 20, with bore 32 of end body 24 being in fluid communication with fluid conveying bore 42. End body 24 defines fluid conveying bore 42, and on opposite side end body 22 defines fluid conveying bore 44. Disposed between end bodies 22 and 24 and, as shown in the closed position of FIG. 2, blocking flow communication between bores 42 and 44 is rotatable valve element, or ball, 46.

Seal 58 is disposed between end bodies 22 and 24 and serves to retain fluid inside valve cavity 48 and prevent fluid from escaping between end bodies 22 and 24. Ball 46 is disposed such that a majority of the ball is housed within cavity 48 of end body 22 and a smaller portion extending into fluid conveying bore 42 of end body 24. Ball 46 has a body including a substantially spherical outer surface 50 with an upwardly facing portion defining recess 52. A pair of seal elements 54 and 56 are disposed within fluid conveying bores 42 and 44 and form an abutting engagement with ball 46 to prevent fluid flow around ball 46 when ball 46 is in the closed position.

Ball 46 further defines passage 60 (along axis 61, FIG. 4) which is capable of alignment with fluid conveying bores 42 and 44 to allow fluid to pass through valve 20. To facilitate passage of fluid through valve 20, ball 46 must be rotated from the position shown in FIG. 2 to an open position (FIGS. 3A and 3B), this being accomplished by user movement of handle 40 which is connected to rotation device 62 via head portion 64 that is received within recess 52 of ball 46.

Rotation device 62 is disposed within bore 66 of end body 22 and is connected to handle 40 via bolt 68. As with the connection between end bodies 22 and 24, a pair of seals 70 and 72 are disposed within end body 22 around rotation device 62 to prevent fluid leakage through bore 66 and around device 62.

Figure 3A:
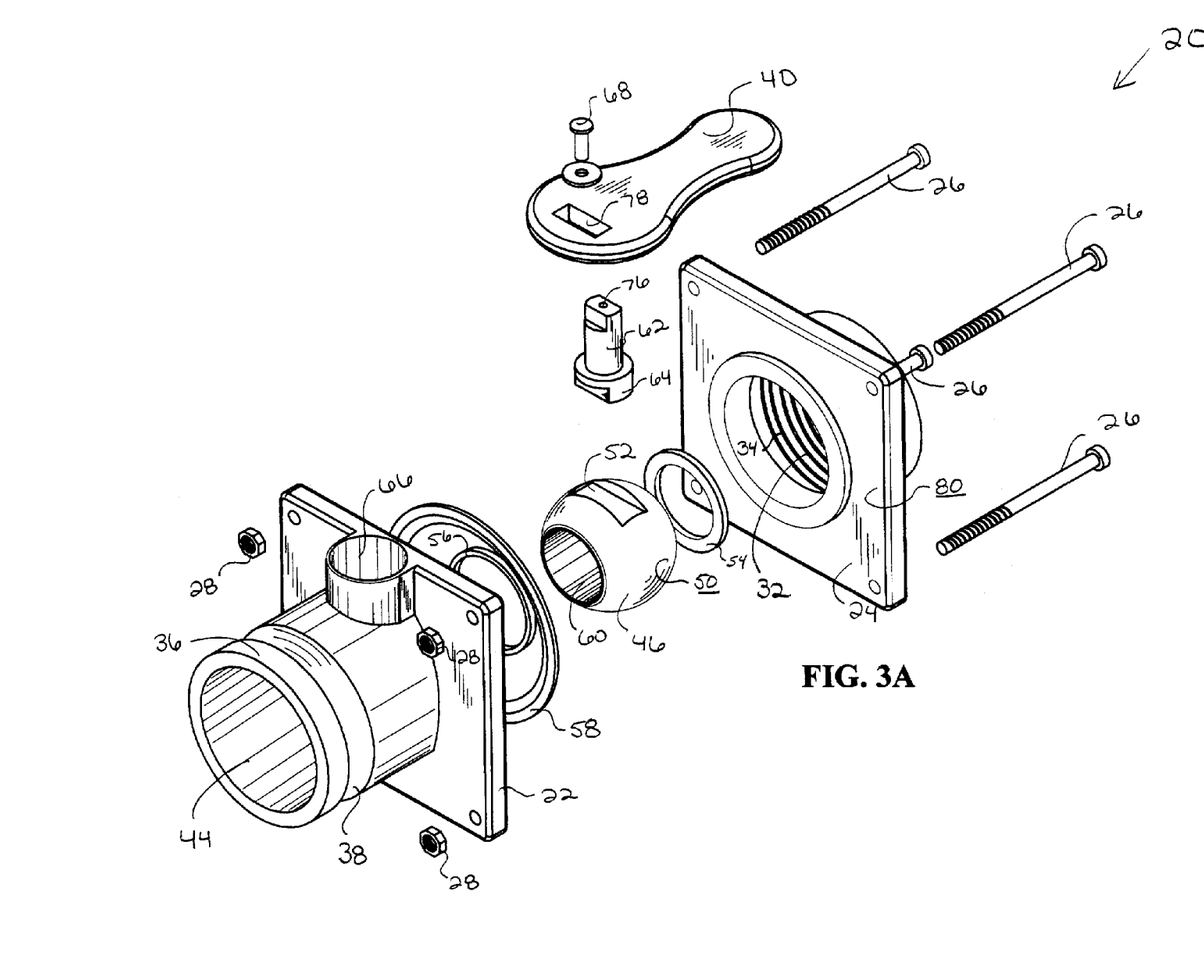
FIG. 3A is an exploded view of the bolted ball valve assembly of FIG. 1, as viewed from a left front perspective.
Figure 3B:
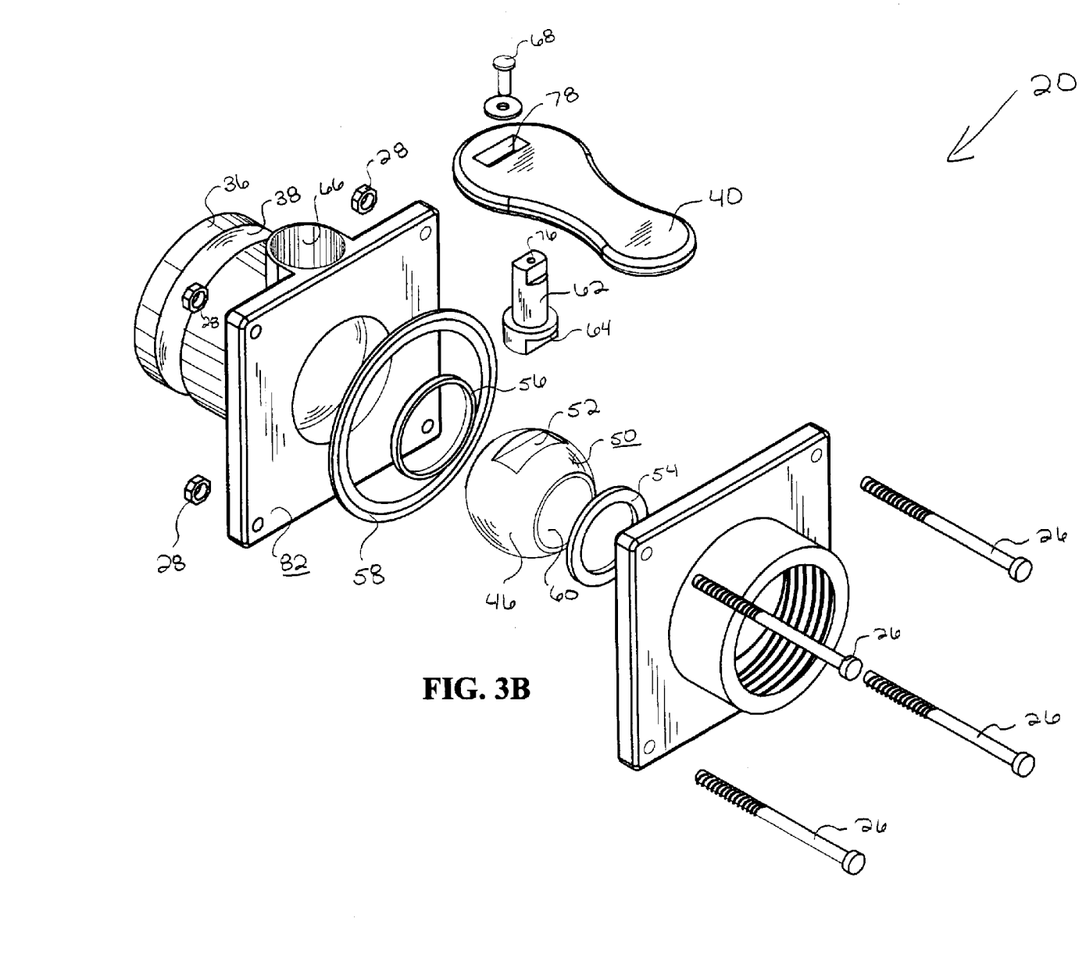
FIG. 3B is an exploded view of the bolted ball valve assembly of FIG. 1, as viewed from a right rear perspective.

Referring to FIGS. 3A and 3B, valve 20 is shown in an exploded view with better views of the individual parts of valve assembly 20. Further shown in FIGS. 3A and 3B is bolt hole 76 in rotation device 62 for receipt of bolt 68 and opening 78 in handle 40 to receive rotation device 62. Both end bodies 22 and 24 have abutting surfaces with end body 22 having surface 82 and end body 24 having abutting face surface 80 which abut at vertical interface 84 (FIG. 1). It is at this interface 84 that a potential leak of fluid could occur and therefore, seal 58 is included in valve assembly 20. Ball 46 is shown in an open position in FIGS. 3A and 3B, or in a position wherein fluid is capable of flowing through valve 20 via fluid conveying bores 42 and 44 and through passage 60 of ball 46 since passage 60 is aligned with fluid conveying bores 42 and 44.

Figure 4:
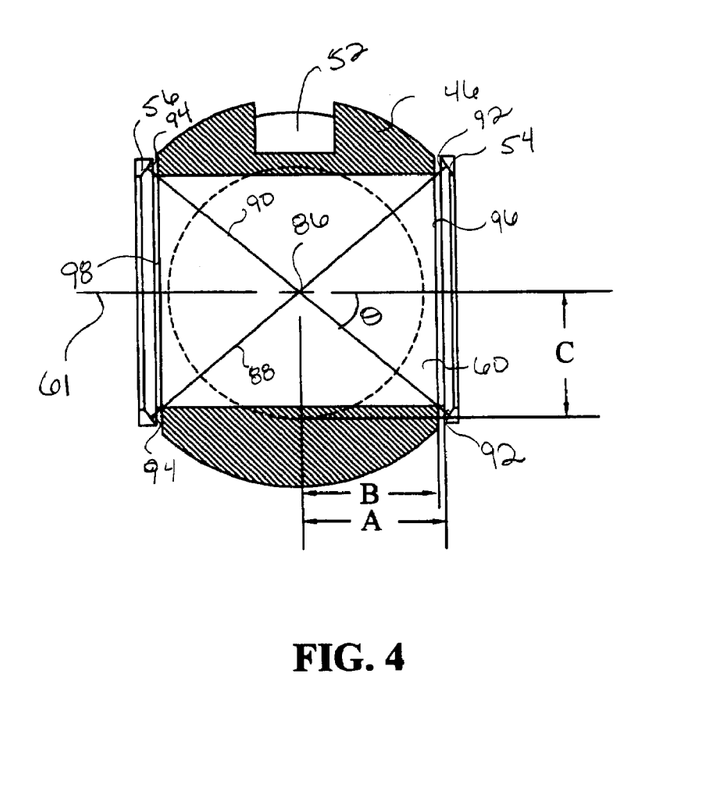
FIG. 4 is an enlarged sectional view of the ball of the bolted ball valve assembly, the ball having being rotated into a position in which the central passage is aligned with the bores of the valve body.
Figure 5:
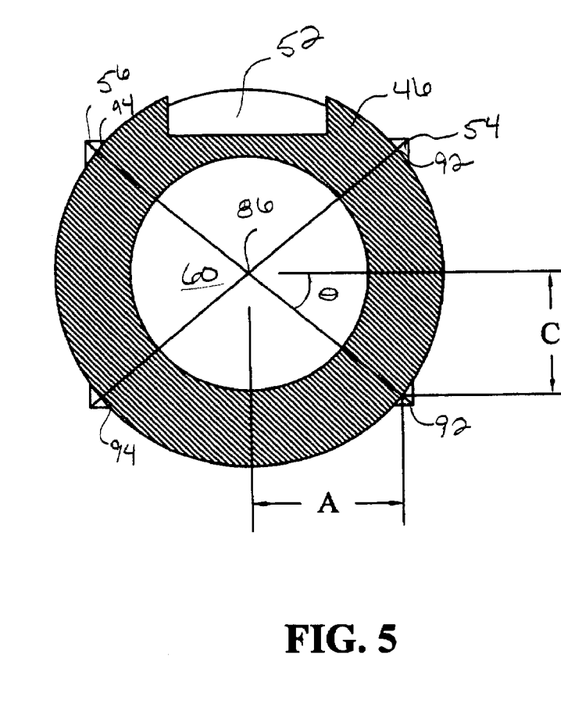
FIG. 5 is an enlarged sectional view of the ball of the bolted ball valve assembly, the ball having being rotated into a position in which the central passage is not aligned with the bores of the valve body.

FIGS. 4 and 5 show ball 46 in both an "open" position in which central passage 60 is aligned with fluid conveying bores 42 and 44 of end bodies 22 and 24 and a "closed" position in which central passage 60 is not aligned with the fluid conveying bores of end bodies 22 and 24, with the position of ball 46 relative to seals 54 and 56 also being shown. Ball 46 is generally spherical shaped but is truncated at inlet port 96 and outlet port 98 of passage 60, which alternatively may be rotated 180°. Due to the truncation, ball 46 is generally appears to be taller than wide when viewed in the open position. Such truncation decreases the distance from inlet port 96 to outlet port 98 and provides a space between ball 46 and end bodies 22 and 24 such that seals 54 and 56 are maintained in the proper position but are not subject to the same compressive forces when ball 46 is in the open position as when ball 46 is in the closed position. The amount of truncation of ball 46, while providing the space, is limited by the requirement that enough of ball 46 remains such that there is sufficient distance between inlet port 96 and outlet port 98 to ensure that there is enough area for seals 54 and 56 to contact ball 46 radially in all directions when ball 46 is rotated to the closed position.

Ball 46 defines center point 86 at the intersection of line 88 and line 90, with line 88 extending from the uppermost portion of seal 54 to the lowermost portion of seal 56 while line 90 extends from the uppermost portion of seal 56 to the lowermost portion of seal 54. Upper and lower are defined as "upper" being proximate the upper portion of valve 20 or where handle 40 is attached and "lower" being defined as the opposite. Both lines 88 and 90 are twice the radius of ball 46, with center point 86 being the point from which the radius would be measured. Center point 86 is useful as a reference point for defining distances and angles, as described below.

Also shown in FIGS. 4 and 5 are seal contact areas 92 and 94 disposed on seals 54 and 56, respectively. These contact areas 92 and 94 are best seen in FIG. 5 wherein they are the points at which ball 46 comes into compressive contact with each seal 54 and 56 when ball 46 is rotated to the closed position, or where the radius of ball 46 (as shown in lines 88 and 90) meets seals 54 and 56. Since seal contact areas 92 and 94 are contacted in the closed position, they appear to be "inside" seals 54 and 56 due to the compression exerted on seals 54 and 56 when ball 46 is rotated to the closed position.

To assemble valve 20 with ball 46 being in an open position, as shown in FIGS. 3A and 3B, yet maintaining proper seal contact between seals 54 and 56 and ball 46, as shown in FIG. 2 when ball 46 is closed, angle θ must be controlled to permit such assembly. As shown in FIGS. 4 and 5, angle θ is defined between a line extending from center point 86 coplanarly with axis 61 and line 90. More particularly, as shown in FIGS. 4 and 5, angle θ is defined between line 90 and a plane defined by the movement of axis 61 between the positions of FIGS. 4 and 5. Another way of defining angle θ is that the tangent of angle θ is equal to the numerical value of distance C divided by the numerical value of distance A. As shown in FIGS. 4 and 5, distance A is the axial distance from a line through center point 86, parallel to seals 54, 56, and perpendicular to axis 61 to a seal contact area of either seal 54 or 56. More particularly, as shown in FIGS. 4 and 5, distance A is the distance from a centerline defining an axis of rotation of ball 46 to a seal contact area of either seal 54 or 56. Although distance A is shown as extending to seal contact area 92 of seal 54, it may be rotated 180° such that it extends to seal contact area 94. Distance C is defined as the radial distance from a line coplanar with axis 61, perpendicular to seals 54, 56, and through center point 86 to a seal contact area, either seal contact area 92 or seal contact area 94. Also shown in FIG. 4 is distance B which is measured from a line through center point 86 and perpendicular to axis 61 to either inlet 96 or outlet 98.

As stated previously, the tangent of angle θ is equal to the numerical value of distance C divided by the numerical value of distance A. To ensure proper sealing and the ability to assemble ball valve assembly 20 with ball 46 in its open position, the tangent of θ must be equal to less than 1, or angle θ must be less than 45°, therefore, distance C is less than distance A. Since angle θ is less than 45°, it can be said that lines 88 and 90 are not perpendicular to each other since twice angle θ is less than 90°. As shown in FIG. 4, distance B is less than distance A, with the overall distances being such that distance A, or the distance from a line through center point 86 and perpendicular to axis 61 to seal contact area 92 or 94 is the largest distance, and distance C, the radial distance from a line through center point 86 and perpendicular to seals 54, 56, to seal contact area 92 or 94 being the smallest of the distances. Distance B is less than distance A but greater than distance C. Thus, by utilizing such a structure, valve assembly 20 is capable of being mechanically assembled with ball 46 being in the open position and thereby requiring less force for the assembly process, and yet ensuring that fluid is unable to flow around ball 46 when it is rotated into the closed position.

Although seals 54 and 56 are shown as not contacting ball 46 when in the open position of FIG. 4, seals 54 and 56 may contact ball 46 in the open position, even though ball 46 is not exerting the same compressive forces, as in the closed position, and not contacting seal contact areas 92 and 94. Contact between ball 46 and seals 54 and 56, when ball 46 is in the open position, is determined by distance B, or the distance to the inlet or outlet ports. If distance B is only very slightly less than distance A, then ball 46 will contact seals 54 and 56 in the open position, but will not be exerting compressive forces on the seals. However, as the difference between distance A and distance B increases, then a point is reached at which ball 46 will not contact seals 54 and 56 when ball 46 is in the open position.

The distances associated with ball 46 do not vary between the open position and closed positions of ball 46. Although seals 54 and 56 are compressed when ball 46 is in its closed position, seal contact areas 92 and 94 are not substantially moved as a result of the compression, and, thus, distances A and C remain substantially unchanged. Specifically, compressive contact between ball 46 and seals 54 and 56 may cause additional areas of seals 54 and 56 to contact ball 46, but the axial and radial distances from center point 86 to seal contact areas 92 and 94 would not substantially change. Likewise the radius of ball 46, or half of each line 88 and 90, would not change. However, seals 54 and 56 are sufficiently flexible to conform to ball 46 when in the closed position to ensure a fluid tight seal around ball 46 thereby substantially preventing fluid flow around ball 46.

Valve assembly 20 is assembled by placing seal 56 in the proper position and ball 46 against it within the cavity in second body portion 22 and in an open position, then placing seal 54 against ball 46 and against end body 24. Since the majority of ball 46 is held by end body 22, the rotation device 62 is inserted into bore 66 and handle 40 attached thereto. Bolts 26 and nuts 28 are then placed in the appropriate positions and connected, thereby causing seals 54 and 56 to contact ball 46, as well as be compressed against respective end bodies 22 and 24. Thus, valve assembly 20 is assembled with the ball in the open position; however, ball 46 may then be rotated to the closed position, if desired, for possible assembly of valve 22 other fluid handling components. Although seals 54 and 56 contact ball 46 in the open position, the pressure on seals 54 and 56 is less when ball 46 is in the open position than in the closed position since fluid flow is desired when the ball is in the open position, thus less pressure, and fluid flow is very undesirable in the closed position, thus greater pressure is required to close possible fluid flow points around ball 46.

Although ball 46 is shown as a truncated generally spherical element, other geometric structures may be utilized. For example, an elliptical element could be used, with the truncation occurring along the major axis of the elliptical element. Other structures, such as, for example ovoid shapes, could also be utilized, provided that the diameter of the truncated element is sufficient to accommodate the necessary port size through the element and that enough of the element remains after truncation such that the inlet port and the outlet port are spaced apart to provide sufficient area for the seals to be compressed by the ball in all radial directions when the ball is rotated to the closed position.

While this invention has been described as having exemplary structures, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A valve assembly for controlling a flow of fluid, comprising:
   a first end body defining a fluid conveying bore;
   a second end body selectively detachable from said first end body and defining at least one fluid conveying bore;

a rotatable valve element having a center point and a radius, said rotatable valve element having a first position wherein said first end body fluid conveying bore and said second end body fluid conveying bore are not in fluid communication, and a second position, wherein said first end body fluid conveying bore and said second end body fluid conveying bore are in fluid communication; and at least a pair of seal members, a first said seal member disposed in said first end body and a second said seal member disposed in said second end body, said seals structured and arranged to substantially prevent fluid flow when said rotatable valve element is in said first position, each said seal having a seal contact area wherein said radius of said rotatable valve element contacts said seal contact area when said rotatable valve element is in said first position;

said rotatable valve element defining a passage having an axis, a first axial distance being defined between a line through said center point and perpendicular to said axis and said seal contact area when said rotatable valve element is in said second position, a radial distance being defined between said axis and said seal contact area when said rotatable valve element is in said second position, said radial distance being perpendicular to said first axial distance, and a second axial distance being defined between said line and an end of said passage;

wherein a ratio of said radial distance to said axial distance has a numerical value of less than 1, and said second axial distance is less than said first axial distance.

2. A valve assembly of claim 1 wherein said radial distance is less than said second axial distance.

3. The valve assembly of claim 1 wherein said second end body defines an interior cavity, said interior cavity structured and arranged to house at least a majority of said rotatable valve element.

4. The valve assembly of claim 1 wherein said passage is substantially in alignment with said first end body fluid conveying bore and said second end body fluid conveying bore when said rotatable valve element is in its said second position.

5. The valve assembly of claim 1 wherein said passage is aligned to be out of fluid communication with said first end body fluid conveying bore and said second end body fluid conveying bore when said rotatable valve element is in its said first position.

6. The valve assembly of claim 1 further comprising means for rotating said rotatable valve element between said first position and said second position.

7. The valve assembly of claim 1 further comprising a rotation device operably connected to said rotatable valve element, said rotatable valve element being rotated between said first position and said second position by said rotation device.

8. The valve assembly of claim 1 wherein said rotatable valve element is adapted to exert a greater compressive force on said seals members when said rotatable valve element is in said first position than when said body is in said second position.

9. The valve assembly of claim 8 wherein said rotatable valve element is adapted to exert no compressive force on said seal members when said body is in said second position.

10. A valve assembly for controlling a flow of fluid, comprising:
a first end body defining a fluid conveying bore;

a second end body selectively detachable from said first end body and defining at least one fluid conveying bore;

a rotatable valve element having a center point and a radius, said rotatable valve element having a first position wherein said first end body fluid conveying bore and said second end body fluid conveying bore are not in fluid communication, and a second position, wherein said first end body fluid conveying bore and said second end body fluid conveying bore are in fluid communication; and at least a pair of seal members, a first said seal member disposed in said first end body and a second said seal member disposed in said second end body, said seals structured and arranged to substantially prevent fluid flow when said rotatable valve element is in said first position, each said seal having a seal contact area wherein said radius of said rotatable valve element contacts said seal contact area when said rotatable valve element is in said first position, and wherein said seal contact area does not contact said rotatable valve element when said rotatable valve element is in said second position;

said rotatable valve element defining a passage having an axis, an axial distance being defined between a line through said center point and perpendicular to said axis and said seal contact area when said rotatable valve element is in said second position, a radial distance being defined between said axis and said seal contact area when said rotatable valve element is in said second position, said radial distance being perpendicular to said axial distance;

wherein a ratio of said radial distance to said axial distance has a numerical value of less than 1.

11. The valve assembly of claim 10 wherein a first end of said passage is in fluid communication with said first end fluid conveying bore and a second end of said passage is in fluid communication with said second end fluid conveying bore when said rotatable valve element is in its said second position.

12. A rotatable element for a ball valve assembly having at least one body portion for the rotatable element and associated seals, said rotatable element comprising:
a body having a generally spherical outer surface and having a radius at which said body is adapted to contact a seal contact area of the seals when said body is in a closed position;

said body defining a passage having a central axis, an inlet end and an outlet end, said rotatable element having an axis of rotation;

wherein a first axial distance is defined between said axis of rotation and the seal contact area, a radial distance is defined between said passage central axis and the seal contact area when said body is in an open position, and a second axial distance is defined between said axis of rotation and one of said inlet end and said outlet end; and wherein a ratio of said radial distance to said first axial distance has a numerical value of less than 1, and said second axial distance is less than said first axial distance.

13. The rotatable element of claim 12 wherein said radial distance is less than said second axial distance.

14. The rotatable element of claim 12 further comprising a rotation device, said rotatable element being rotated by said rotation device.

15. The rotatable element of claim 14 further comprising a recessed portion in said generally spherical surface, said recessed portion receiving at least a portion of said rotation device.

16. The rotatable element of claim 12 wherein said body is adapted to exert a greater compressive force on said seals when said body is in said closed position than when said body is in said open position.

17. The rotatable element assembly of claim 16 wherein said body is adapted to exert no compressive force on said seals when said body is in said open position.

18. The rotatable element of claim 12 wherein the first axial distance is defined between the axis of rotation and a closest point thereto on the seal contact area.

19. The rotatable element of claim 12 wherein said body is separated from each of said seals by a respective planar gap when said body is in said open position.

20. The rotatable element of claim 12 wherein said body is adapted to maintain the contact with the seal contact area throughout movement of said body between the open and closed positions.

21. The rotatable element of claim 12 wherein an amount of the contact between said body and the seal contact area continuously increases throughout movement of said body from the open position to the closed position.

22. The rotatable element of claim 12 wherein the seal contact area defines a seal axis, the seal axis being substantially parallel to said passage central axis when said body is in the open position.

23. A valve assembly for controlling a flow of fluid, comprising:
  a first end body defining a fluid conveying bore;
  a second end body selectively detachable from said first end body and defining at least one fluid conveying bore;
  a rotatable valve element having a rotational axis and an outer surface, said rotatable valve element having a first position wherein said first end body fluid conveying bore and said second end body fluid conveying bore are not in fluid communication, and a second position, wherein said first end body fluid conveying bore and said second end body fluid conveying bore are in fluid communication via a passage of said rotatable valve element; and
  at least a pair of seal members, a first said seal member disposed in said first end body and a second said seal member disposed in said second end body, said seals structured and arranged to substantially prevent fluid flow when said rotatable valve element is in said first position, each said seal having a seal contact area wherein said outer surface of said rotatable valve element contacts said seal contact area when said rotatable valve element is in said first position, said seals being subject to a greater compressive force from said outer surface of said rotatable valve element when said rotatable valve element is in said first position than when said rotatable valve element is in said second position, a first axial distance defined between the rotational axis of said rotatable valve element and said seal contact area being greater than a second axial distance defined between the rotational axis and an end of said passage of said rotatable valve element.

24. A valve assembly for controlling a flow of fluid, comprising:
  a first end body defining a fluid conveying bore;
  a second end body selectively detachable from said first end body and defining at least one fluid conveying bore;
  a rotatable valve element having a center point and an outer surface, said rotatable valve element having a first position wherein said first end body fluid conveying bore and said second end body fluid conveying bore are not in fluid communication, and a second position, wherein said first end body fluid conveying bore and said second end body fluid conveying bore are in fluid communication; and
  at least a pair of seal members, a first said seal member disposed in said first end body and a second said seal member disposed in said second end body, said seals structured and arranged to substantially prevent fluid flow when said rotatable valve element is in said first position, each said seal having a seal contact area wherein said outer surface of said rotatable valve element contacts said seal contact area when said rotatable valve element is in said first position, said rotatable valve element exerting no compressive force on said seals when said rotatable valve element is in said second position.

* * * * *

UNITED STATES PATENT AND TRADEMARK OFFICE
CERTIFICATE OF CORRECTION

PATENT NO. : 6,971,633 B2  Page 1 of 1
APPLICATION NO. : 10/272192
DATED : December 6, 2005
INVENTOR(S) : Mark E. Gillen It is certified that error appears in the above-identified patent and that said Letters Patent is hereby corrected as shown below:

Column 7, line 29, delete "distance to said axial distance" and insert --distance to said first axial distance --

Signed and Sealed this

Eighteenth Day of July, 2006

JON W. DUDAS
*Director of the United States Patent and Trademark Office*